(12) United States Patent
Kim et al.

(10) Patent No.: US 7,758,987 B2
(45) Date of Patent: Jul. 20, 2010

(54) FUEL CELL SYSTEM

(75) Inventors: Ju-Yong Kim, Suwon-si (KR); Hyun-Jeong Lim, Suwon-si (KR); Ji-Seong Han, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 498 days.

(21) Appl. No.: 11/218,495

(22) Filed: Sep. 6, 2005

(65) Prior Publication Data

US 2006/0051631 A1  Mar. 9, 2006

(30) Foreign Application Priority Data

Sep. 7, 2004 (KR) ............... 10-2004-0071155

(51) Int. Cl.
*H01M 2/00* (2006.01)
*H01M 8/18* (2006.01)

(52) U.S. Cl. .................................. 429/34; 429/19
(58) Field of Classification Search .............. 429/13
See application file for complete search history.

(56) References Cited

U.S. PATENT DOCUMENTS

| | | | | |
|---|---|---|---|---|
| 6,077,620 A | * | 6/2000 | Pettit | ............... 429/26 |
| 6,382,264 B1 | | 5/2002 | Tsai | |
| 2003/0082427 A1 | | 5/2003 | Prasad | |
| 2003/0129464 A1 | * | 7/2003 | Becerra et al. | ............... 429/25 |
| 2004/0096721 A1 | * | 5/2004 | Ohlsen et al. | ............... 429/34 |
| 2006/0141321 A1 | * | 6/2006 | Pristash | ............... 429/34 |

FOREIGN PATENT DOCUMENTS

| | | |
|---|---|---|
| CA | 2467093 A1 * | 5/2003 |
| CN | 1489233 | 4/2004 |
| JP | 01-314934 | 12/1989 |
| JP | 2001-006707 | 1/2001 |
| JP | 2002-036892 | 2/2002 |
| JP | 2003-092128 | 3/2003 |
| JP | 2004-207110 | 7/2004 |
| KR | 1020040009654 | 1/2004 |
| KR | 1020040028542 | 4/2004 |
| KR | 1020040028548 | 4/2004 |
| KR | 1020040060839 | 7/2004 |

* cited by examiner

*Primary Examiner*—Patrick Ryan
*Assistant Examiner*—Muhammad Siddiquee
(74) *Attorney, Agent, or Firm*—Robert E. Bushnell, Esq.

(57) ABSTRACT

A fuel cell system includes at least one electricity generating element to generate electrical energy through an electrochemical reaction of hydrogen and oxygen, and a reaction source supplier adapted to connect to the electricity generating element and to provide a hydrogen-containing fuel and oxygen-containing air to the electricity generating element. The reaction source supplier includes a first divided region for storing compressed air, a second divided region for storing the fuel, and a storage region having an elastic partition adapted to divide the adjacent first and second divided regions.

14 Claims, 6 Drawing Sheets

FUEL CELL SYSTEM

CLAIM OF PRIORITY

This application makes reference to, incorporates the same herein, and claims all benefits accruing under 35 U.S.C. §119 from an application for FUEL CELL SYSTEM AND FUEL SUPPLY APPARATUS earlier filed in the Korean Intellectual Property Office on 7 Sep. 2004 and there duly assigned Serial No. 10-2004-0071155.

BACKGROUND OF THE INVENTION

1. Field of the Invention

The present invention relates to a fuel cell system. More particularly, the present invention relates to a fuel cell system including a reaction source supplier to provide hydrogen along with an oxidant.

2. Description of the Related Art

A fuel cell is a power generation system for producing electrical energy through the electrochemical redox reaction of oxygen and a fuel, such as hydrogen or a hydrocarbon-based material such as methanol, ethanol, natural gas, or the like.

A fuel cell can be classified into a phosphoric acid type, a molten carbonate type, a solid oxide type, a polymer electrolyte type, or an alkaline type depending upon the kind of electrolyte used. Although each of these different types of fuel cells operates in accordance with the same basic principles, they can differ from one another in the kind of fuel, the operating temperature, the catalyst, and the electrolyte used.

Recently, a Polymer Electrolyte Membrane Fuel Cell (PEMFC) has been developed. The PEMFC has power characteristics that are superior to those of conventional fuel cells, as well as a lower operating temperature and faster start and response characteristics. Because of this, the PEMFC can be applied to a wide range of applications, such as portable electrical power sources for automobiles, distributed power sources for houses and public buildings, and small electrical power sources for electronic devices.

A PEMFC is essentially composed of a stack, a reformer, a fuel tank, and a fuel pump. The stack forms a body of the PEMFC, and the fuel pump provides the fuel stored in the fuel tank to the reformer. The reformer reforms the fuel to generate the hydrogen gas and supplies the hydrogen gas to the stack. Accordingly, in the PEMFC, a fuel stored in the fuel tank is pumped to the reformer through a fuel pump and then the reformer reforms a fuel to generate a hydrogen gas. The hydrogen gas and air are supplied to a stack through respective pumps. The stack generates electrical energy through an electrochemical reaction of the hydrogen gas and oxygen in the air.

A fuel cell system in accordance with the conventional art contains pumps for respectively supplying a fuel stored in a fuel tank to a reformer and air to a stack. Since parasite powers are increased for driving such pumps, energy efficiency of the whole system is deteriorated. The prior fuel cell system also needs space for equipping such pumps and so it is difficult to make the whole system down-sized and compact.

SUMMARY OF THE INVENTION

An embodiment of the present invention provides a fuel cell system that contains a supplier for providing both fuel and air, thereby reducing parasitic power needed for driving the system and rendering the entire system down-sized and compact.

A fuel cell system according to the present invention includes at least one electricity generating element adapted to generate electrical energy through an electrochemical reaction of hydrogen and oxygen, and a reaction source supplier adapted to connect to the electricity generating element and to provide a hydrogen-containing fuel and an oxygen-containing air to the electricity generating element. The reaction source supplier includes a first divided region for storing compressed air, a second divided region for storing the fuel, and a storage region including an elastic partition adapted to divide the adjacent first and second divided regions.

The elastic partition can have a diaphragm structure, and the storage region can contain a fuel cartridge adapted to be removeably attached to the second divided region.

In the fuel cell system according to the present invention, the reaction source supplier can contain a compressor adapted to connect to the first divided region and to supply compressed air into the first divided region. The compressor and the first divided region can be connected to each other by a first supply line.

In the fuel cell system according to the present invention, the reaction source supplier can further contain a reformer adapted to connect to the storage region and to generate hydrogen gas from the fuel through a chemical catalytic endothermic reaction and to supply the hydrogen gas to the electricity generating element.

In the fuel cell system according to the present invention, the reformer can include a heating source for generating heat energy through a catalytic oxidation reaction between the fuel and oxygen, a reforming reacting region for generating hydrogen gas from the fuel by absorbing the heat energy, and at least one carbon monoxide reduction region adapted to reduce carbon monoxide concentration in the hydrogen gas through a preferential catalytic oxidation reaction of carbon monoxide.

In this fuel cell system, the second divided region can be connected to the heating source by a second supply line, the first divided region can be connected to the heating source by a third supply line, and the second divided region can be connected to the reforming reacting region by a fourth supply line. The first divided region can be connected to the carbon monoxide reduction region by a fifth supply line, the carbon monoxide reduction region can be connected to the electricity generating element by a sixth supply line, and the first divided region can be connected to the electricity generating element by a seventh supply line.

A plurality of the electricity generating elements can be stacked to form a stack.

As described above, the fuel cell system according to the present invention can be a Polymer Electrolyte Membrane Fuel Cell (PEMFC) or a Direct Oxidation Fuel Cell (DOFC).

The elastic partition of the reaction source supplier can be composed of a material that can be elastically deformed by pressure of the compressed air.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

An embodiment of the present invention will hereinafter be described in detail with reference to the accompanying drawings. However, the present invention can have various modifications and equivalent arrangements and it is to be understood that the invention is not limited to the described embodiments.

Figure 1:
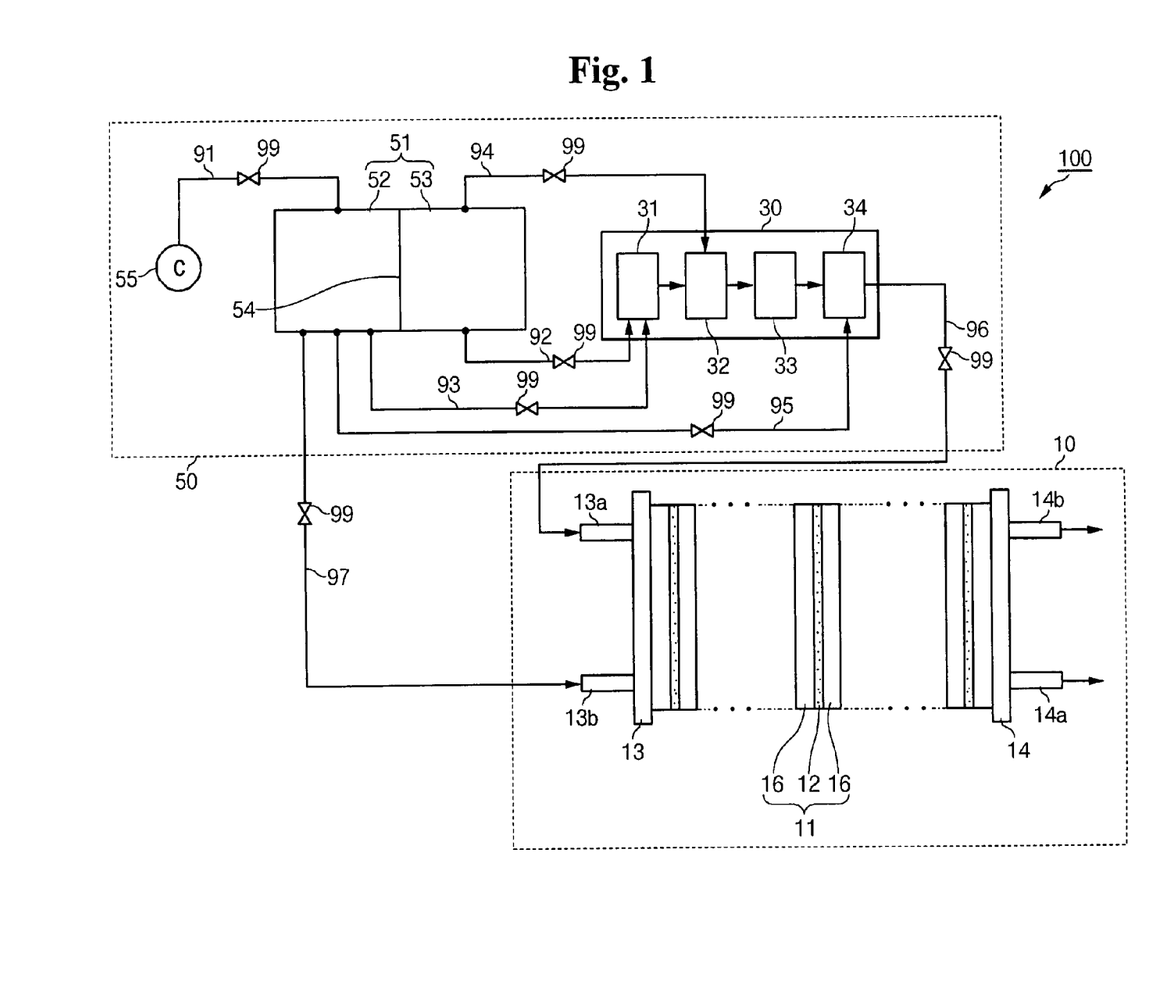
FIG. 1 is a schematic diagram of an entire structure of a fuel cell system according to one embodiment of the present invention.
Figure 2:
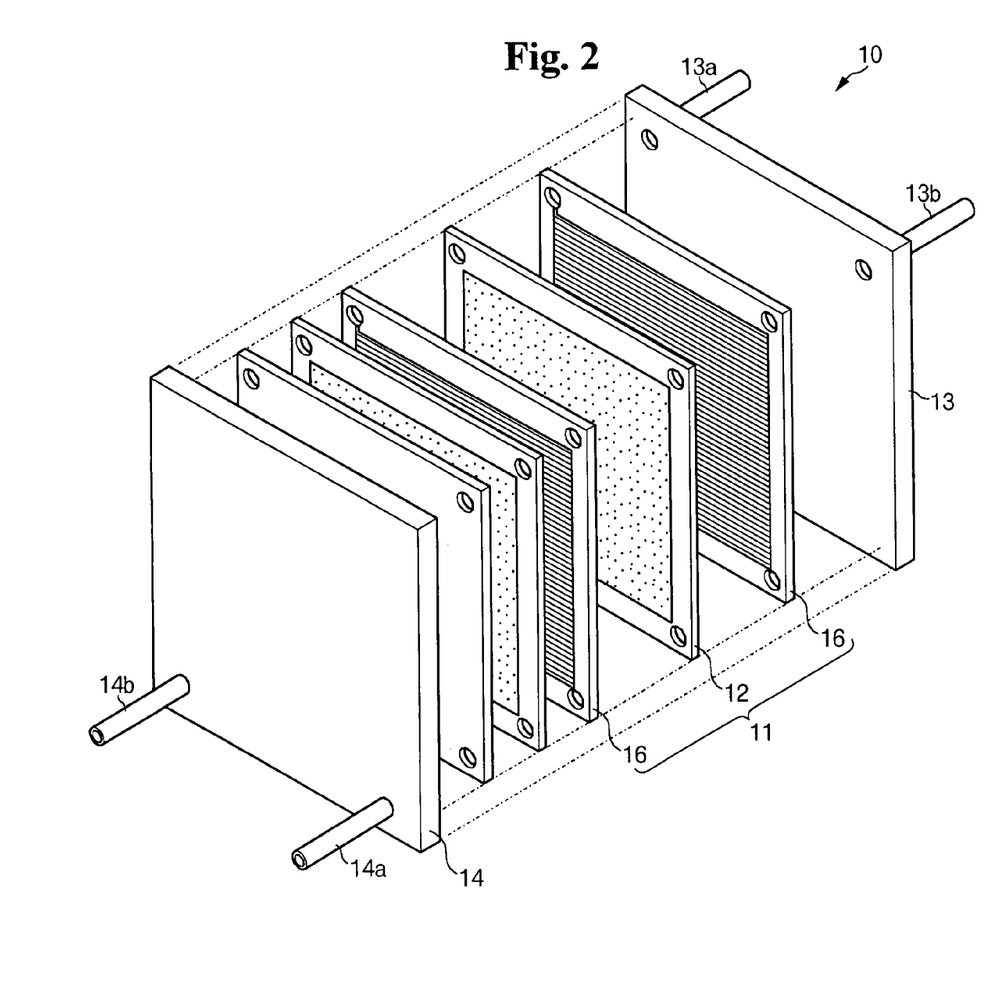
FIG. 2 is an exploded perspective view of the stack structure of FIG. 1.

FIG. 1 is a schematic diagram of an entire structure of a fuel cell system according to one embodiment of the present invention and FIG. 2 is an exploded perspective view of the stack structure of FIG. 1.

According to the embodiment of the present invention with reference to the drawings, a fuel cell system 100 uses a Polymer Electrolyte Membrane Fuel Cell (PEMFC), which generates hydrogen gas by reforming a hydrogen-containing fuel and then electricity by electrochemically reacting the hydrogen and oxidizing agent.

A fuel used to generate electricity in the fuel cell system 100 can be any type of fuels such as methanol, ethanol, or natural gas, and the like whether liquid or gas. However, the fuel is defined as a liquid for convenience in the following description of the present specification.

The fuel cell system 100 can use oxygen gas preserved in a separate storage unit or air including oxygen as an oxidizing agent. However, hereinafter, the latter will be described as an example.

According to the present embodiment, the fuel cell system 100 includes an electricity generating element 11 that generates electrical energy through the electrochemical reaction of hydrogen and an oxidizing agent and a reaction source supplier 50 which generates hydrogen gas from a hydrogen-containing fuel and supplies the hydrogen gas and air to the electricity generating element 11.

The electricity generating element 11 is formed as a minimum unit for generating electricity by disposing a Membrane-Electrode Assembly (MEA) 12 between two separators 16 and then a stack 10 is formed with a stacked structure by arranging a plurality of minimum units. The stack 10 can additionally include pressing plates 13 and 14 for positioning a plurality of the electricity generating elements 11 to be closely adjacent to each other at the outermost ends of the stack 10. However, the stack 10 of a fuel cell according to the present embodiment can be formed by positioning the separators 16 at the outermost ends of the electricity generating element 11 to play a role of pressing the electricity generating elements 11 instead of using the separate pressing plates 13 and 14. On the contrary, the pressing plates 13 and 14 can be formed to intrinsically function as the separators 16 other than to closely arrange a plurality of electricity generating elements 11, which will be further illustrated in the following.

The membrane-electrode assembly 12 has an anode and a cathode at both sides thereof and functions to oxidize and reduce hydrogen and oxygen in the air. The separators 16 supply hydrogen gas and air through gas passage paths formed at both sides of the membrane-electrode assembly 12 and also function as a conductor connecting the anode and the cathode in series.

The pressing plate 13 has a first inlet 13a to supply hydrogen gas into a hydrogen passage path of the separator 16 and a second inlet 13b to supply air into an air passage path of the separator 16. The other pressing plate 14 has a first outlet 14a to release hydrogen gas remaining after a reaction at the anode of the membrane-electrode assembly 12, and a second outlet 14b to release air remaining after reacting with hydrogen and moisture generated through a reduction reaction of oxygen at the cathode of the membrane-electrode assembly 12.

Figure 3:
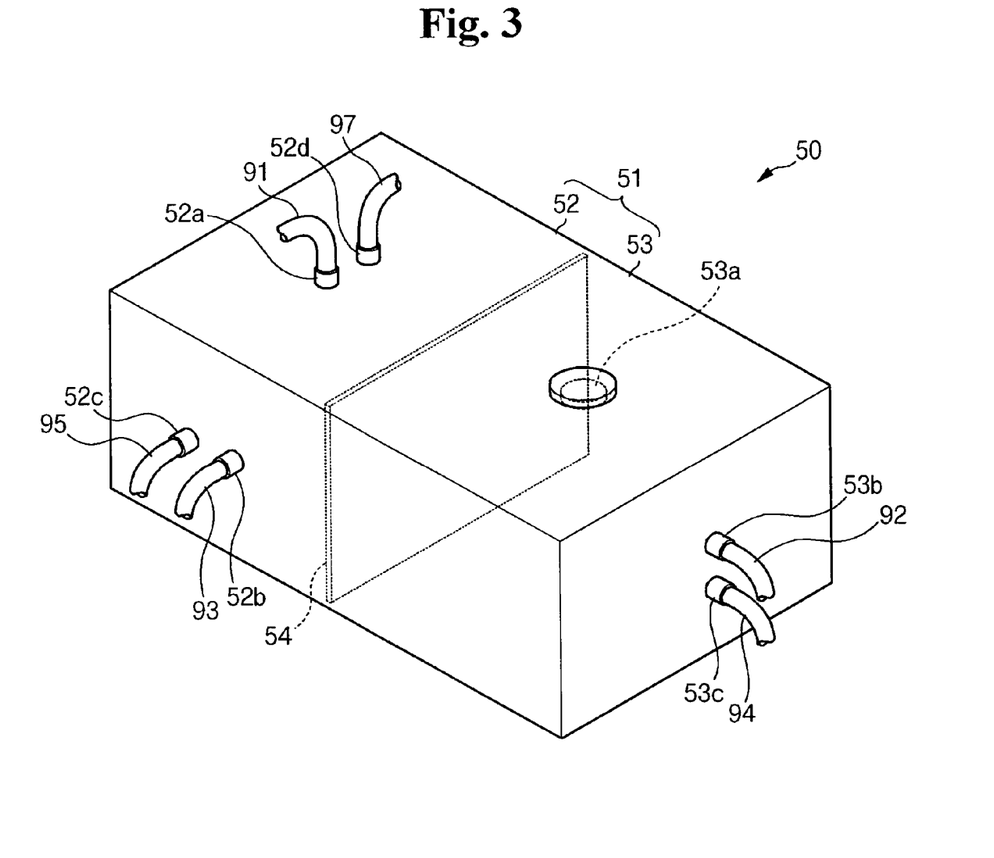
FIG. 3 is a perspective view of a structure of a storage region in the reaction source supplier of FIG. 1.
Figure 4:
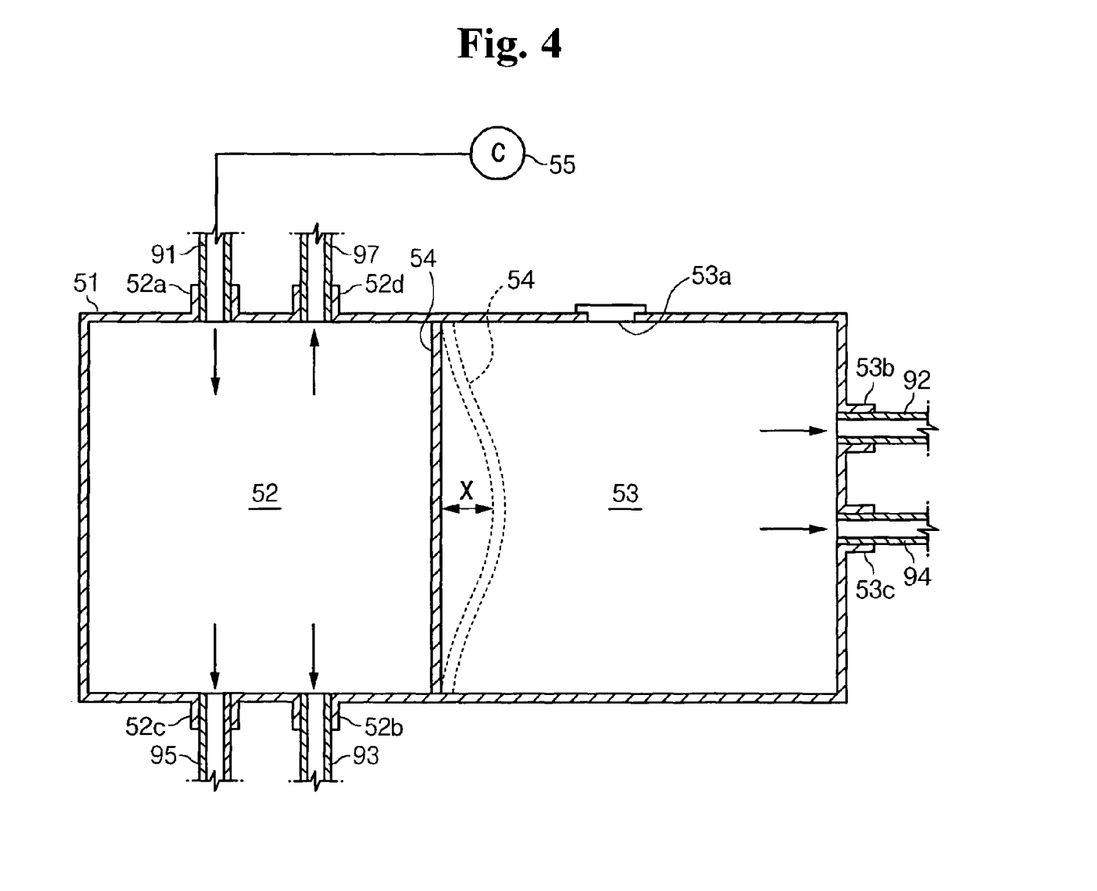
FIG. 4 is a schematic diagram of a structure and function of a storage region in the reaction source supplier of FIG. 3.

FIG. 3 is a perspective view of the structure of a storage region in the reaction source supplier of FIG. 1, and FIG. 4 is a schematic diagram to explain the function and structure of the reaction source supplier of FIG. 3.

Referring to FIGS. 3 and 4, the reaction source supplier 50 for supplying hydrogen and air to the electricity generating element 11 in the stack 10 according to the embodiment of the present invention will be described in further detail.

As shown in FIGS. 1 to 4, according to the present embodiment, the reaction source supplier 50 is mounted to connect to the electricity generating element 11, generates hydrogen gas from a hydrogen-containing fuel, and supplies the hydrogen gas and air together to the electricity generating element 11.

The reaction source supplier 50 includes a storage region 51 with separate inner spaces for respectively storing compressed air and a hydrogen-containing fuel, and a reformer 30 connected and mounted with the storage region 51 and the stack 10 for generating hydrogen from the fuel and supplying the hydrogen to the stack 10.

The storage region 51 is a sealed container with inner spaces of a predetermined volume and includes a first divided region 52 storing compressed air and a second divided region 53 storing the fuel.

The first and second divided regions 52 and 53 are separated by an elastic partition 54 installed inside the storage region 51. The elastic partition 54 is installed about the middle of the storage region 51 and prevents materials from moving back and forth between the first and second divided regions 52 and 53. Also, the elastic partition 54 can be formed of transformable and elastic materials, so that it can be curved toward the second divided region 53 when a predetermined air pressure is supplied to the first divided region 52 due to the compressed air supplied to the inner space thereof. The elastic partition 54 is elastically transformed toward the inside of the second divided region 53 due to the pressure of the compressed air stored in the first divided region 52 and releases fuel stored in the second divided region 53. For the elastic partition 54, a diaphragm can be used.

The first divided region 52 is capable of elastically transforming the elastic partition 54 by using the pressure of the compressed air and simultaneously supplying the compressed air to the reformer 30 and the stack 10. Accordingly, the first divided region 52 has an inlet port 52a for supplying compressed air to the inner space thereof and three outlet ports 52b, 52c, and 52d for releasing the compressed air out of the container.

Also, the second divided region 53 stores fuel supplied from a separate fuel tank (not illustrated in the drawing) and supplies the fuel to the reformer 30 by the air pressure inside the first divided region 52. It also has an inlet port 53a for putting a fuel thereinto and two first and second outlet ports 53b and 53c for releasing the fuel stored in the inner space thereof out of the container.

The reaction source supplier 50 also has a compressor 55 capable of supplying compressed air to the first divided region 52 of the storage region 51 with the aforementioned structure. The compressor 55 can be of various types, depending on the structure and operation, for example, screw-shaped air compressors wherein two female and male rotors spin in opposite directions as a pair and spirally compress air inflowing in a pivot direction, turbo air compressors rotating a plurality of impellers at high speed, or reciprocating air compressors wherein a reciprocating piston compresses air inflowing into a cylinder. However, the aforementioned art of the compressor 55 is well-known in the related art and is not illustrated in further detail in the present specification. The compressor 55 is connected to the inlet port 52a of the first divided region 52 by a first supply line 91.

In addition, the reformer 30 includes a heating source 31 for commonly generating heat energy through a catalytic oxidation reaction of fuel and air, a reforming reaction region 32 generating hydrogen gas from the fuel through a vapor-reforming catalyst reaction by the heat energy, and carbon monoxide reduction regions 33 and 34 for reducing the concentration of carbon monoxide included in the hydrogen gas.

The carbon monoxide reduction regions 33 and 34 can include a first carbon monoxide reduction region 33, which additionally generates hydrogen gas through a Water-Gas Shift (WGS) catalyst reaction and primarily reduces the concentration of carbon monoxide included in the hydrogen gas, and a second carbon monoxide reduction region 34, which secondarily reduces the concentration of carbon monoxide included in the hydrogen gas through a Preferential CO Oxidation (PROX) catalytic reaction of the hydrogen gas and air.

The heating source 31, the reforming reaction region 32, and the carbon monoxide reduction regions 33 and 34 of the reformer 30 can be respectively formed to have a cylindrical shape and to be connected by a pipeline.

Figure 5:
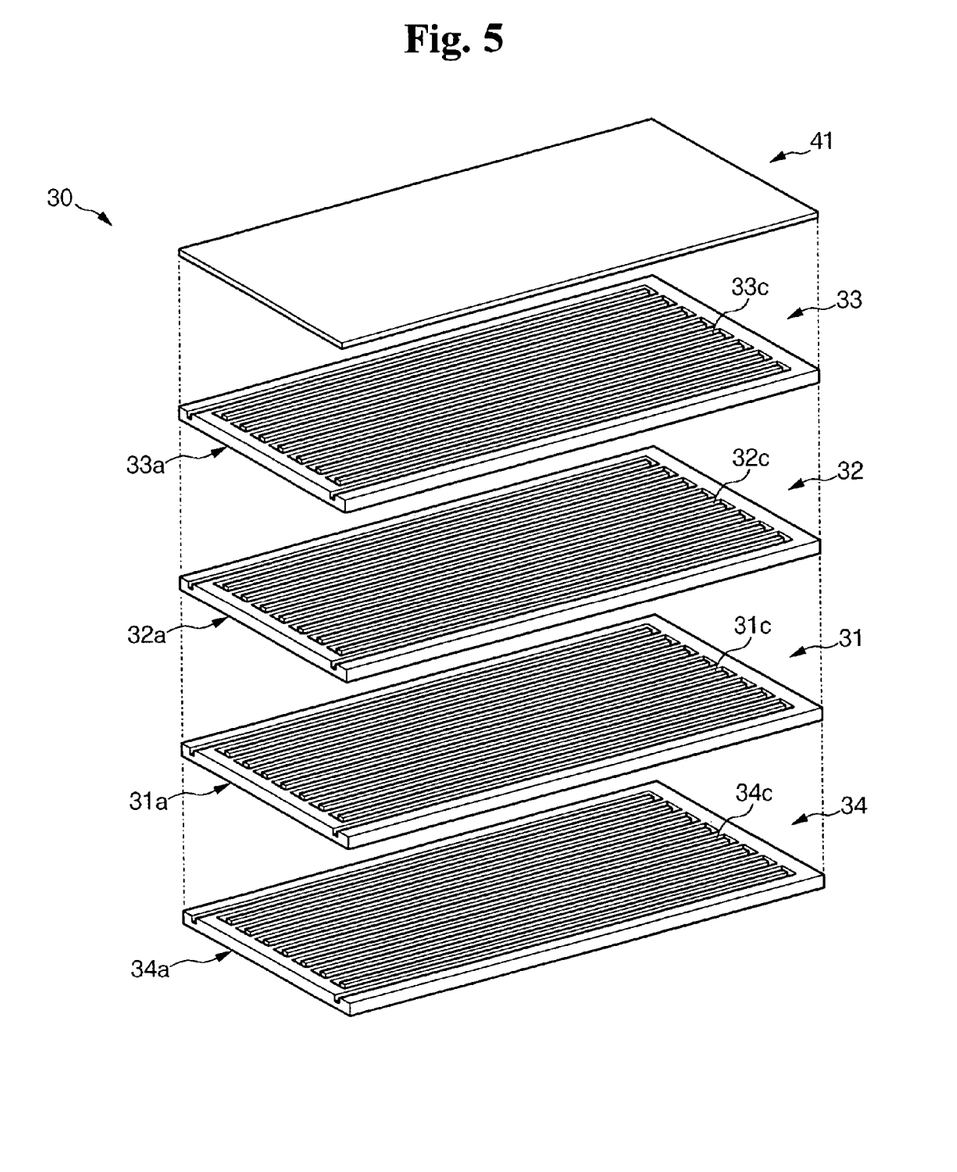
FIG. 5 is an exploded perspective view of a structure of a reformer of a fuel cell system according to one embodiment of the present invention.

FIG. 5 is an exploded perspective view of a reformer 30 applied to a fuel cell system according to one embodiment of the present invention, wherein a heating source 31, a reforming reaction region 32, and carbon monoxide reduction regions 33 and 34 are formed to have a stacked plate shape for enabling a fuel to flow therebetween.

The reformer 30 is formed by stacking the reforming reaction region 32 and the first carbon monoxide reduction region 33 in order on top of the heating source 31 and the second carbon monoxide reduction region 34 beneath the heating source 31.

More specifically, it is formed by stacking the second reaction substrate 32a and the third reaction substrate 33a on top of the first reaction substrate 31a in order and the forth reaction substrate 34a beneath the first reaction substrate 31a as illustrated in the drawing when the first substrate 31a is regarded as a criteria. In addition, a cover plate 41 can be additionally combined on top of the third reaction substrate 33a positioned outermost of the reformer 30.

Then, the reformer 30 has channels 31c, 32c, 33c, and 34c for enabling a fuel to flow on the surface of each reaction substrate 31a, 32a, 33a, and 34a. The channels 31c, 32c, 33c, and 34c have a catalyst layer on their internal surfaces (not illustrated in the drawing).

The reformer 30 is connected to the storage region 51, wherein the heating source 31 of the reformer 30 is respectively connected to the first and second divided regions 52 and 53 of the storage region 51. More specifically, the heating source 31 is connected to the first outlet port 53b of the second divided region 53 by a second supply line 92 and also to the first outlet port 52b of the first divided region 52 by a third supply line 93. The reforming reaction region 32 in the reformer 30 is connected to the second divided region 53, and more specifically to the second outlet port 53c thereof, by a fourth supply line 94. In addition, the second carbon monoxide reduction region 34 in the reformer 30 is connected to the first divided region 52, and more specifically to the second outlet port 52c thereof, by a fifth supply line 95.

On the other hand, the second carbon monoxide reduction region 34 is connected to a first inlet 13a of the stack 10 by a sixth supply line 96, and the third outlet port 52d of the first divided region 52 is connected to the second inlet 13b of the stack 10 by a supply line 97. Each supply line connecting the storage region 51 with each region of the reformer 30 and the stack 10 has a valve 99 for selectively opening and closing. The valve 99 can be regulated by a controller (not illustrated in the drawing) separately mounted thereon.

According to another embodiment of the present invention, a fuel cell system 100 can alternatively adopt a direct oxidation fuel cell method, wherein electricity can be generated by directly supplying a fuel to the stack 10. Unlike the aforementioned polymer electrolyte fuel cell, a direct oxidation fuel cell does not require the aforementioned reformer 30. Therefore, the direct oxidation fuel cell is formed to have the first divided region 52 connected to the second inlet 13b of the stack 52 to supply air and the second divided region 53 connected to the first inlet 13a of the stack 10 to supply hydrogen gas.

A direct oxidation fuel cell fabricated according to the present embodiment of the present invention is explained in further detail as follows.

First of all, a second divided region 53 is charged inside with a liquid hydrogen-containing fuel, and then a first divided region 52 is supplied with air compressed by a compressor 55 into the inner space thereof through a first supply line 91.

Then, a diaphragm 54 installed inside a storage region 51 is elastically curved by the pressure of the aforementioned compressed air toward the inner space of the second divided region 53 in the storage region 51 to a predetermined degree like "X" in FIG. 4, and the fuel stored inside the second divided region 53 is supplied to a heating source 31 of the reformer 30 through a second supply line 92. In other words, since the fuel in the second divided region 53 is pressured as the elastic partition 54 is expanded, it can be supplied to the heating source of the reformer 30 through the second supply line 92. Simultaneously, the compressed air stored in the first divided region 52 is supplied to the heating source 31 of the reformer 30 through a third supply line 93. Then, the heating source 31 generates reaction heat with a predetermined temperature through an oxidation catalyst reaction of the fuel and air. The compressor 55 is in a state of continuously operating to supply compressed air to the internal space of the first divided region 52.

Next, the fuel stored inside the second divided region 53 is supplied to a reforming reaction region 32 of the reformer 30 through a fourth supply line 94. Since the elastic partition 54 installed inside the storage region 51 is curved toward the inner space of the second divided region 53 by the pressure of the compressed air in the first divided region 52, the fuel in the second divided region 53 can be supplied to the reforming reaction region 32. Then, the reforming reaction region 32 absorbs heat energy generated from the heating source 31 and generates hydrogen gas from the fuel through a vapor reforming catalyst reaction by using the heat energy. That is, the reforming reaction region 32 generates hydrogen gas including a small amount of carbon dioxide and hydrogen since the fuel is decomposed through the vapor reforming catalyst reaction. It also generates hydrogen gas including a small amount of carbon monoxide as a byproduct.

Then, the hydrogen gas including the small amount of carbon monoxide is supplied to a first carbon monoxide reduction region 33.

The first carbon monoxide reduction region 33 additionally generates hydrogen gas through a Water-Gas Shift (WGS) catalyst reaction, primarily reducing the concentration of carbon monoxide included in the hydrogen gas.

Subsequently, the hydrogen gas is supplied to a second carbon monoxide reduction region 34, and simultaneously, the compressed air stored inside the first divided region 52 is also supplied to the second carbon monoxide reduction region 34 through a fifth supply line 95. The second carbon monoxide reduction region 34 reduces the concentration of carbon monoxide included in the hydrogen gas through a preferential catalyst reaction of the hydrogen gas and air, and sends the hydrogen gas into an electricity generating element 111 in the stack 10 through a sixth supply line 96.

Finally, the compressed air stored in the first divided region 52 of the storage region 51 is supplied to the electricity generating element 11 in the stack 10 through the aforementioned processes.

Then, the hydrogen gas is supplied to the anode of a membrane-electrode assembly 12 through the hydrogen passage path of a separator 16. Air is also supplied to the cathode of a membrane-electrode assembly 12 through the air passage path of a separator 16.

Next, the hydrogen gas is oxidized to generate electrons and protons at the anode. The protons move to the cathode through the electrolyte membrane, but the electrons move not through the electrolyte membrane but through the separator 16 to the cathode of a membrane-electrode assembly 12, generating an electric current, and also water and heat as a byproduct.

Figure 6:
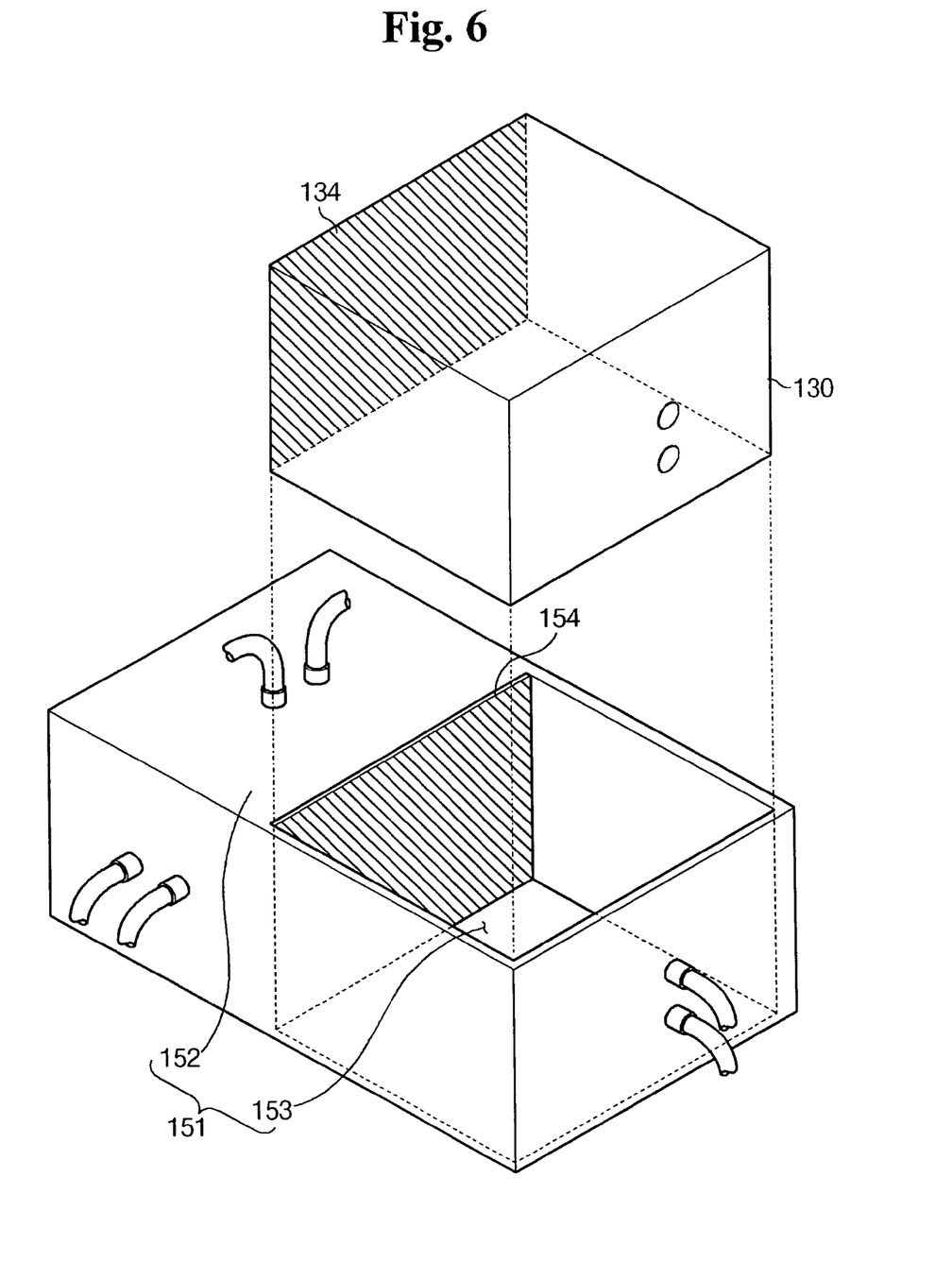
FIG. 6 is an exploded perspective view of a structure of a storage region of a fuel cell system according to another embodiment of the present invention.

On the other hand, FIG. 6 is an exploded perspective view of a storage region in a fuel cell system according to another embodiment of the present invention.

According to this embodiment of the present invention, the storage region 151 includes a first divided region 152 storing compressed air and a second divided region 153 storing the aforementioned fuel. The first and second divided regions 152 and 153 are separated by an elastic partition 154 installed inside the storage region 151. The elastic partition 154 is installed about the middle of the internal space of the storage region 151, preventing materials from flowing back and forth between the first and second divided regions 152 and 153.

According to this embodiment of the present invention, the second divided region 153 opens on one side to receive a fuel cartridge 130 thereinto. The fuel cartridge 130 has a structure capable of mounting and dismounting itself from the storage region 151, so that it can use a fuel stored in advance and need not be supplied with a fuel from a separate fuel tank.

The fuel cartridge 130 can have another elastic partition 134 corresponding to the elastic partition 154 of the storage region 151. These elastic partitions 134 and 154 are formed of elastic and transformable materials, so that they can be curved toward the inner space of the second divided region 153 when compressed air is supplied to the first divided region 152 to produce a predetermined air pressure. Elastic partitions 134 and 154 play a role of releasing a fuel stored in the second divided region 153, being elastically curved toward the inner space of the second divided region 153 by the air pressure of the compressed air stored in the first divided region 152. A diaphragm can be used for the elastic partitions 134 and 154.

In accordance with one embodiment of the present invention, the fuel cell system contains a reaction source supplier that supplies a fuel to a stack to generate electricity through a singular compressor. The parasitic power consumed for driving the entire system can be reduced and energy efficiency of the system can be more improved.

The fuel system of the present invention does not contain a plurality of pumps unlike the prior art and adopts a singular compressor to realize a down-sized and compact system.

While the present invention has been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims.

What is claimed is:

1. A fuel cell system, comprising:
   at least one electricity generating element adapted to generate electrical energy through an electrochemical reaction of hydrogen and oxygen; and
   a reaction source supplier adapted to connect to the electricity generating element and to provide a hydrogen-containing fuel and oxygen-containing air to the electricity generating element, the reaction source supplier having a storage region having rigid walls, comprising:
      a first divided region adapted to store compressed oxygen-containing air;
      a second divided region adapted to store the fuel;
      a flexible diaphragm directly attached to the rigid walls of the storage region that divides the adjacent first and second divided regions and deforms in a concave manner with no contact to any other structure of the fuel cell under pressure from said compressed oxygen-containing air and exerts pressure on said fuel stored in said second divided region, the first divided region being connected to the at least one electricity generating element to supply the oxygen-containing air; and
   a reformer adapted to connect to the second divided region and to generate hydrogen gas from the fuel through a chemical catalytic endothermic reaction and to supply the hydrogen gas to the electricity generating element.

2. The fuel cell system of claim 1, wherein the storage region comprises a fuel cartridge adapted to be removeably attached to the second divided region.

3. The fuel cell system of claim 1, wherein the reaction source supplier comprises a compressor adapted to connect to the first divided region and to supply compressed oxygen-containing air to the first divided region.

4. The fuel cell system of claim 3, further comprising a first supply line adapted to connect the compressor to the first divided region.

5. The fuel cell system of claim 1, wherein the reformer comprises:
   a heating source adapted to generate heat energy through a catalytic oxidation reaction between the fuel and oxygen;
   a reforming reacting region adapted to generate hydrogen gas from the fuel by absorbing the heat energy; and
   at least one carbon monoxide reduction region adapted to reduce carbon monoxide concentration in the hydrogen gas through a preferential catalytic oxidation reaction of carbon monoxide.

6. The fuel cell system of claim 5, further comprising a second supply line adapted to connect the second divided region of the storage region to the heating source of the reformer.

7. The fuel cell system of claim 6, further comprising a third supply line adapted to connect the first divided region of the storage region to the heating source of the reformer.

8. The fuel cell system of claim 7, further comprising a fourth supply line adapted to connect the second divided region of the storage region to the reforming reacting region of the reformer.

9. The fuel cell system of claim 8, further comprising a fifth supply line adapted to connect the first divided region of the storage region to the carbon monoxide reduction region of the reformer.

10. The fuel cell system of claim 9, further comprising a sixth supply line adapted to connect the carbon monoxide reduction region of the reformer to the electricity generating element.

11. The fuel cell system of claim 1, further comprising a seventh supply line adapted to connect the first divided region of the storage region to the electricity generating element.

12. The fuel cell system of claim 1, wherein a plurality of the electricity generating elements are stacked to form a stack.

13. The fuel cell system of claim 1, comprising a Polymer Electrolyte Membrane Fuel Cell (PEMFC).

14. The fuel cell system of claim 1, comprising a Direct Oxidation Fuel Cell (DOFC).

* * * * *